(12) United States Patent
Frutschi

(10) Patent No.: US 6,202,399 B1
(45) Date of Patent: Mar. 20, 2001

(54) METHOD FOR REGULATING A GAS TURBO-GENERATOR SET

(75) Inventor: Hans Ulrich Frutschi, Riniken (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/201,779

(22) Filed: Dec. 1, 1998

(30) Foreign Application Priority Data

Dec. 8, 1997 (EP) .................................................. 97810953

(51) Int. Cl.⁷ .................................. F02C 7/26; F02C 1/06
(52) U.S. Cl. ........................ 60/39.03; 60/39.06; 60/39.17
(58) Field of Search ............................... 60/39.03, 39.06, 60/39.17

(56) References Cited

U.S. PATENT DOCUMENTS

| 4,045,955 | * | 9/1977 | Brannstrom et al. | 60/39.281 |
| 5,481,865 | * | 1/1996 | Frutschi | 60/39.03 |
| 6,038,848 | * | 3/2000 | Frutschi | 60/39.05 |

FOREIGN PATENT DOCUMENTS

| 0646704A1 | 4/1995 | (EP) . |
| 0646705A1 | 4/1995 | (EP) . |
| 0718470A2 | 6/1996 | (EP) . |

* cited by examiner

*Primary Examiner*—Charles G. Freay
(74) *Attorney, Agent, or Firm*—Burns, Doane, Swecker, & Mathis, L.L.P.

(57) ABSTRACT

In a method for regulation a gas turbo-generator set operated with sequential combustion, the fuel quantity necessary for operating the first combustion changer is first controlled as a function of a pressure prevailing at the outlet of the compressor. The ratio between this fuel quantity and this pressure is continuously updated by means of a factor reproducing the deviation of a temperature at the inlet into the first turbine from the desired value of this temperature. A fuel quantity necessary for operating the second combustion chamber is controlled as a function of a pressure prevailing at the inlet into the second turbine, and the ratio between this fuel quantity and this pressure is likewise continually updated by means of a factor reproducing the deviation of the inlet temperature into the second turbine from the desired value of this temperature. The inertias in the system are neutralized by means of this pressure backup regulation.

6 Claims, 1 Drawing Sheet

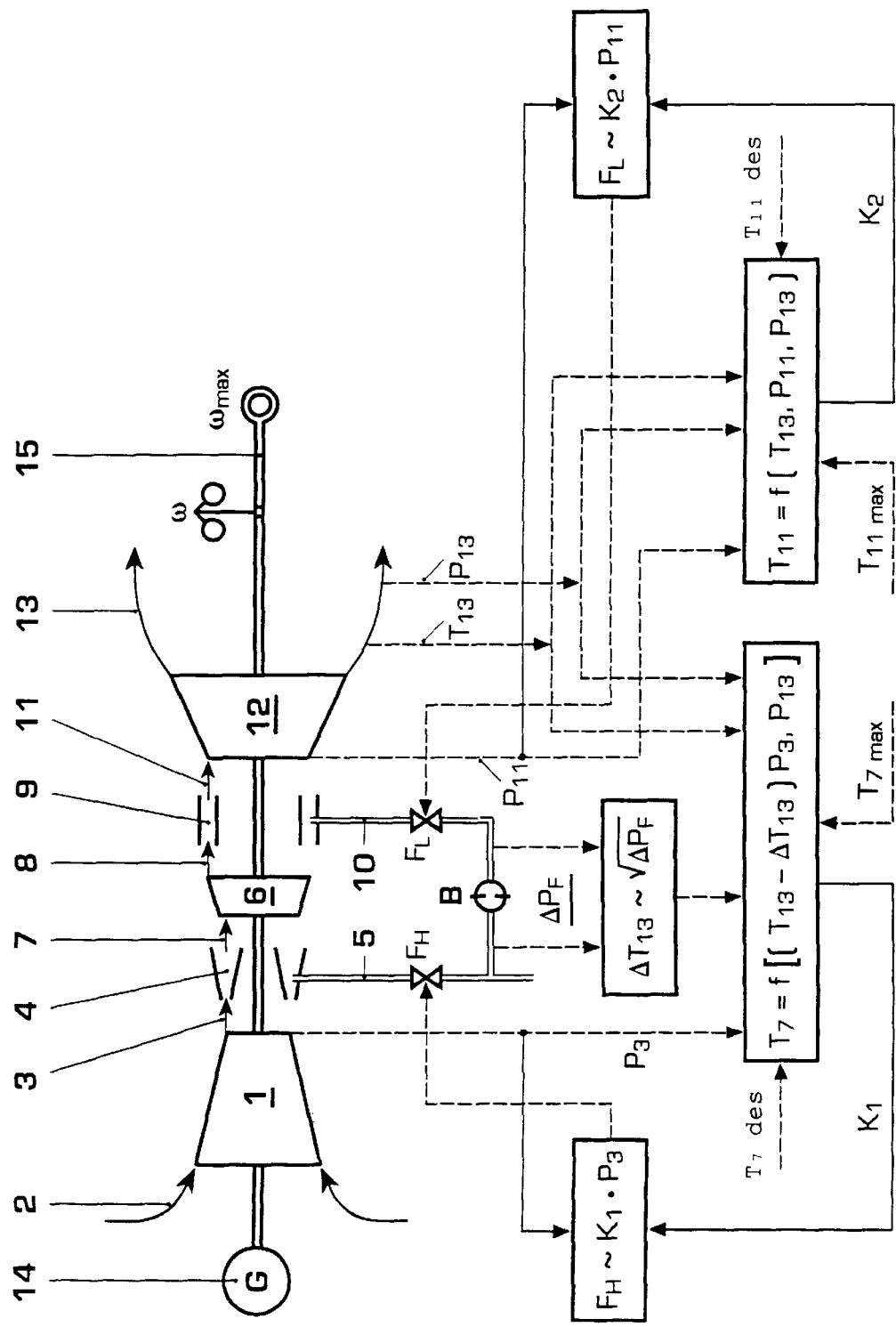

METHOD FOR REGULATING A GAS TURBO-GENERATOR SET

BACKGROUND OF THE INVENTION

Field of the Invention

EP-0 646 704 A1 disclosed a method for regulating a gas turbo-generator set. This gas turbo-generator set consists essentially of a compressor unit, an HP combustion chamber, an HP turbine, an LP combustion chamber, an LP turbine and a generator. The fuel quantity for the HP combustion chamber is dimensioned by means of a corrected temperature signal which is formed by the value of the temperature at the outlet of the LP turbine, minus the respective temperature rise detectable there. This temperature signal is recorded by subtracting the generated temperature rise caused by the fuel quantity introduced into the LP combustion chamber from the measured temperature at the outlet of the LP turbine. The uncorrected temperature signal at the outlet of the LP turbine is used for dimensioning the fuel quantity for the LP combustion chamber.

In this method, the temperatures which are indispensable for regulation are recorded at locations where there is reliable technical implementation and repeatability. In this case, this regulating concept assumes that a temperature increase at the outlet of the LP turbine caused by the firing of the LP combustion chamber, can be recorded repeatably. A regulating concept for the metering of fuel into the two combustion chambers can be drawn up accordingly by means of this procedure.

Although this regulating concept makes it possible to control fuel metering effectively, it is repeatedly evident that sudden unforeseen disturbances, which have an indirect or direct effect on the process temperatures, cannot be mastered by regulation, as the situation arises, due to the inherent inertias of such a system.

SUMMARY OF THE INVENTION

The invention is intended to remedy this. The object on which the invention, as defined in the claims, is based is, in a method of the initially mentioned type, to eliminate the inertias in the recording of temperatures which are indispensable for regulation.

According to the invention, the system inertias to be expected from the outset are eliminated by controlling the fuel quantities, together with the pressures prevailing there by regulation which is aimed at pressure backup.

In this case, the fuel quantity for the high pressure combustion chamber is first controlled as a function of the pressure prevailing at the compressor outlet, the ratio between this fuel quantity and the compressor outlet pressure being continuously updated by means of a factor which reproduces the deviation of the inlet temperature into the high pressure turbine from the desired value of this temperature. The fuel quantity for the low pressure combustion chamber is controlled as a function of the pressure prevailing at the inlet into the low pressure turbine, the ratio between this fuel quantity and the pressure at the inlet into the low pressure turbine being likewise continuously updated by means of a factor reproducing the deviation of the inlet temperature into the low pressure turbine from the desired value of this temperature.

The essential advantage of the invention is to be seen in that the measured or calculated temperature is no longer used directly as the sole criterion for regulating the fuel quantity, but, instead, regulation which functions by pressure backup and which reacts, as the situation arises, to the ratio of the pressure to the fuel quantity is introduced. This directness is achieved because the pressure reacts immediately to a variation in the flow mass.

Advantageous and expedient developments of the solution according to the invention for achieving the object are defined in the further dependent claims.

An exemplary embodiment of the invention is explained in more detail below with reference to the drawing. All the elements unnecessary for an immediate understanding of the invention are omitted. The directions of flow of the media and regulating pulses within the example shown are indicated by arrows.

BRIEF DESCRIPTION OF THE DRAWING

A more complete appreciation of the invention and many of the attendant advantages thereof will be readily obtained as the same becomes better understood by reference to the following detailed description, when considered in connection with the accompanying drawing, wherein the single FIGURE shows a gas turbo-generator set together with an integrated regulating diagram.

DESCRIPTION OF THE PREFERRED EMBODIMENTS

Referring now to the drawing, the FIGURE shows a gas turbo-generator set which serves as a basis for the regulation basically described further above. This gas turbo-generator set has a compressor unit 1, in which the compression of the intake air 2 takes place. The air 3 thus compressed then flows into a first combustion chamber, a high pressure combustion chamber 4 (HP combustion chamber), in which the first provision of hot gases 7 takes place by means of a supplied fuel 5. Downstream of this HP combustion chamber 4 operates a first turbine 6, a high pressure turbine (HP turbine), in which, when they flow through, the hot gases 7 provided in the HP combustion chamber 4 experience partial expansion. This partial expansion is characterized in that the partially expanded hot gases 8 from the HP turbine 6 still have a relatively high temperature, of the order of magnitude of 1000° C. and above. Said HP turbine 6 accordingly consists of only a few rows of moving blades, preferably 1–3 stages. Downstream of the HP turbine 6, a second combustion chamber 9, a low pressure combustion chamber (LP combustion chamber), which functions on an autoignition principle, takes effect. Reference is made, in this respect, to EP-0,620,362 A1, this publication forming an integral part of the present description. The LP combustion chamber 9 has essentially the form of an annular throughflow duct, into which preferably a gaseous fuel 10 is injected. When the temperature of the exhaust gases 8 from the HP turbine is at the above-mentioned temperature level, autoignition of the injected fuel 10 takes place in the LP combustion chamber 9. This LP combustion chamber 9 has flow aids, not illustrated in any more detail here, which give rise, in the region of the flame front, to a stabilizing backflow zone for ensuring a reliable combustion operation. The partially expanded hot gases 8 are accordingly conditioned again in the LP combustion chamber 9 into full-grade hot gases 11, the temperature of which corresponds approximately to that of the HP combustion chamber 4. In principle, the temperatures of the hot gases 7, 11 have no direct thermal dynamic limit; this limit is predetermined, instead, primarily by the turbines to be acted upon and their machine elements. These hot gases 11 then act upon a second turbine 12, a low pressure turbine (LP turbine), in which ultimate expansion first takes place. The caloric remanence potential of the exhaust gases 13 may be used, for example, for generating steam in a following steam circuit. A generator 14 ensures the generation of current from the work output of the two turbines 6, 12. An essential feature of the gas turbo-generator set shown is, that all the turbomachines 1, 6, 12 are mounted as a unit on a continuous shaft 15 which is preferably supported on two bearings (not shown). The two combustion chambers 4, 9 occupy the intermediate space between the two turbines 6, 12, the HP combustion chamber 4 being designed preferably as an annular combustion chamber and being largely superposed on the compressor unit 1, in such a way as to contribute substantially to making it possible for the gas turbo-generator set to become a compact unit. This possibility cannot be fully implemented with regard to the LP combustion chamber 9 for flow-related reasons; it must be said, here, nonetheless, that the lastmentioned combustion chamber is very short, so that the sought-after aim of producing a compact gas turbo-generator set is definitely achieved.

The gas turbo-generator set is operated at half power during the startup operation and up to the operating mode, merely by the HP combustion chamber being fired. Compressor guide blade rows, partially closed initially, are opened in succession. The fuel quantity 5 for the HP combustion chamber 4 is regulated in the conventional way as a function of the temperature $T_{13}$ at the outlet of the LP turbine 12 and of the compressor final pressure $P_3$ or the compressor pressure ratio $\pi$ according to the relation:

$$T_7 = A(T_{13} - \Delta T_{13}) + (B \cdot \pi) + C \quad (1)$$

A, B and C being the conventionally adapted correcting terms; $T_7$ is the temperature at the inlet into the HP turbine, and $T_{13}$ the temperature at the outlet of the LP turbine, $\Delta T_{13}$ provisionally still remaining at zero.

To subject the machine to further loading, then, the fuel supply 10 into the LP combustion chamber 9 is activated, the regulation of said fuel supply being performed by means of a second conventional relation, namely $$T_{11} = (A' \cdot T_{13}) + (B' \cdot \pi') + C \quad (2)$$

$\pi'$ being equal to $P_{11}/P_{13}$.

The temperature rise $\Delta T_{13}$ at the outlet of the LP turbine 12, which occurs due to the LP combustion chamber 9 being operated, with the fuel quantity 5 of the HP combustion chamber 4 being constant, is introduced into the relation (1) so that the HP combustion chamber 4 is regulated as though the LP combustion chamber 9 were not in operation.

The correctness of the value $\Delta T_{13}$ can be established, with the effect of a calibration, on the occasion of each startup or rundown operation. Said value may also be ascertained at any time by means of a small change in the fuel quantity 10 of the LP combustion chamber 9 by the amount $\Delta m_{FL}$ (the difference between the mass flow and the fuel quantity). This procedure presupposes at least relative measurement of the fuel quantity 10 of the LP combustion chamber 9. Of course, $\Delta T_{13}$ may also be simulated computationally.

In order to obtain a particularly good transitional behavior in regulating terms, it is advantageous to control the two fuel quantities of the HP and LP combustion chambers, at least by means of pressure backup as follows.

The fuel quantity $F_H$ for the HP combustion chamber 4, is first controlled as a function of the pressure $P_3$ prevailing at the outlet of the compressor 1, the ratio between this fuel quantity $F_H$ and the compressor outlet pressure $P_3$ being continuously updated by means of a factor $K_1$ reproducing the deviation of the temperature $T_7$ of the inlet into the HP turbine from the desired value of this temperature $T_7$. The fuel quantity $F_L$ for the LP combustion chamber 9 is controlled as a function of the pressure $P_{11}$ prevailing at the inlet into the LP turbine 12, the ratio between this fuel quantity $F_L$ and the pressure $P_{11}$ at the inlet into the LP turbine 12 being likewise continuously updated by means of a factor $K_2$ reproducing the deviation of the inlet temperature $T_{11}$ into the LP turbine 12 from the desired value of this temperature $T_{11}$.

The following relations apply to the regulation carried out with pressure backup:

$$F_H \sim K_1 \cdot P_3 \quad (3)$$

and $$F_L \sim K_2 \cdot P_{11} \quad (4)$$

The temperature regulating mode illustrated may also be used for the regulation of power and rotational speed, the two $T_{max}$ signals then having a limiting effect on the fuel quantities 5, 10.

Normally, in the event of rotational speed regulation ($\overline{\omega} = \overline{\omega}_{des}$) only the HP fuel quantity 5 is regulated, with the LP combustion chamber 9 extinguished. This is because large machines are virtually never employed for island operation, when a gas turbin is not connected to a grid or has any other connected to another system, and rotational speed regulation is used merely for synchronization. However, it is also possible, after $T_7 = T_{7des}$ has been reached, to cause the $\overline{\omega}$ signal to continue to act on the LP fuel quantity 10.

Conversely, it would be possible to have power regulation $P = P_{des}$ act only on the LP fuel quantity 10, since these machines are rarely operated under half load. It is also possible, however, to transfer the P signal to the HP fuel quantity 5 after the LP combustion chamber 9 has been extinguished.

If process control is difficult, a pressure relevant for the mass throughput of the gas turbo-generator set can also be used for pressure backup, instead of the decrease in the pressures $P_3$ and $P_{11}$, the interdependence between the mass flow and pressure also having to be ensured in the case of this decrease.

It is possible per se, in the case of specific transient load ranges, to determine the temperature $T_7$ at the inlet into the HP turbine 6 by means of the temperature $T_{13} - \Delta T_{13}$ and by means of the pressure ratio $P_3/P_{13}$, the temperature difference $\Delta T_{13}$ representing the rise in temperature $T_{13}$ occurring as a result of the addition of the heat capacity of the LP combustion chamber 9, that is to say this temperature difference can also be suitably derived causally from the absolute or relative fuel quantity $F_L$ into said LP combustion chamber 9. The temperature difference $\Delta T_{13}$ can then be determined from the pressures $P_{11}$ and $P_{13}$ and from the temperature $T_{13}$, this being possible when a predetermined stable temperature value $T_{11}$ is taken as a starting point or when the temperature difference is determined via an empirical repeatable method.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A method for regulating a gas turbo-generator set, comprising a compressor unit, a first combustion chamber following the compressor unit, a first turbine following the first combustion chamber, a second combustion chamber which follows the first turbine and operates by autoignition and the hot gases of which act upon a second turbine, and at least one generator, controlling a fuel quantity $F_H$ necessary for operating the first combustion chamber as a function of a pressure $P_3$ prevailing at the outlet of the compressor, wherein the ratio between the fuel quantity $F_H$ and the pressure $P_3$ is continuously updated by means of a factor $K_1$ which is a measure for the deviation of a temperature $T_7$ at the inlet into the first turbine from the desired value of this temperature $T_{7des}$, wherein a fuel quantity $F_L$ necessary for operating the second combustion chamber is controlled as a function of a pressure $P_{11}$ prevailing at the inlet into the second turbine, and wherein the ratio between this fuel quantity $F_L$ and this pressure $P_{11}$ is likewise continuously updated by means of a second factor $K_2$ which is a measure for deviation of the inlet temperature $T_{11}$ into the second turbine from the desired value of this temperature $T_{11des}$.

2. The method as claimed in claim 1 wherein the temperature $T_7$ is determined by means of the difference between a temperature $T_{13}$ at the outlet of the second turbine and a temperature difference $T_{13}$ occurring as a result of the addition of the heat capacity of the second combustion chamber and by means of the ratio of the pressures $P_3/P_{13}$, where $P_{13}$ is the pressure at the outlet of the second turbine.

3. The method as claimed in claim 2, wherein the temperature difference $T_{13}$ is derived from the absolute or relative fuel quantity $F_L$.

4. The method as claimed in claim 2, wherein the temperature difference $T_{13}$ is determined from the pressures $P_{11}$ and $P_{13}$ and from the temperature $T_{13}$, starting from a calculated predetermined stable temperature value.

5. A method for regulating a gas turbo-generator set, comprising a compressor unit, a first combustion chamber following the compressor unit, a first turbine following the first combustion chamber, a second combustion chamber which follows the first turbine and operates by autoignition and the hot gases of which act upon a second turbine, and at least one generator, controlling a fuel quantity $F_H$ necessary for operating the first combustion chamber as a function of a pressure relevant for the mass throughput of the gas turbo-generator set, wherein the ratio between the fuel quantity $F_H$ and the pressure is continuously updated by means of a factor $K_1$ which is a measure for the deviation of a temperature $T_7$ at the inlet into the first turbine from the desired value of this temperature $T_{7des}$, wherein a fuel quantity $F_L$ necessary for operating the second combustion chamber is controlled as a function of a pressure $P_{11}$ prevailing at the inlet into the second turbine, and wherein the ratio between this fuel quantity $F_L$ and this pressure $P_{11}$ is likewise continuously updated by means of a second factor $K_2$ which is a measure for deviation of the inlet temperature $T_{11}$ into the second turbine from the desired value of this temperature $T_{11des}$.

6. A method for regulating a gas turbo-generator set, comprising a compressor unit, a first combustion chamber following the compressor unit, a first turbine following the first combustion chamber, a second combustion chamber which follows the first turbine and operates by autoignition and the hot gases of which act upon a second turbine, and at least one generator, controlling a fuel quantity $F_H$ necessary for operating the first combustion chamber as a function of a pressure $P_3$ prevailing at the outlet of the compressor, wherein the ratio between the fuel quantity $F_H$ and the pressure $P_3$ is continuously updated by means of a factor $K_1$ which is a measure for the deviation of a temperature $T_7$ at the inlet into the first turbine from the desired value of this temperature $T_{7des}$, wherein a fuel quantity $F_L$ necessary for operating the second combustion chamber is controlled as a function of a pressure relevant for the mass throughput of the gas turbo-generator set, and wherein the ratio between this fuel quantity $F_L$ and the pressure relevant to the mass throughput is likewise continuously updated by means of a second factor $K_2$ which is a measure for deviation of the inlet temperature $T_{11}$ into the second turbine from the desired value of this temperature $T_{11des}$.

* * * * *